T. G. & R. H. RAVELING.
FLY SHIELD.
APPLICATION FILED SEPT. 12, 1911.
1,070,914.
Patented Aug. 19, 1913.
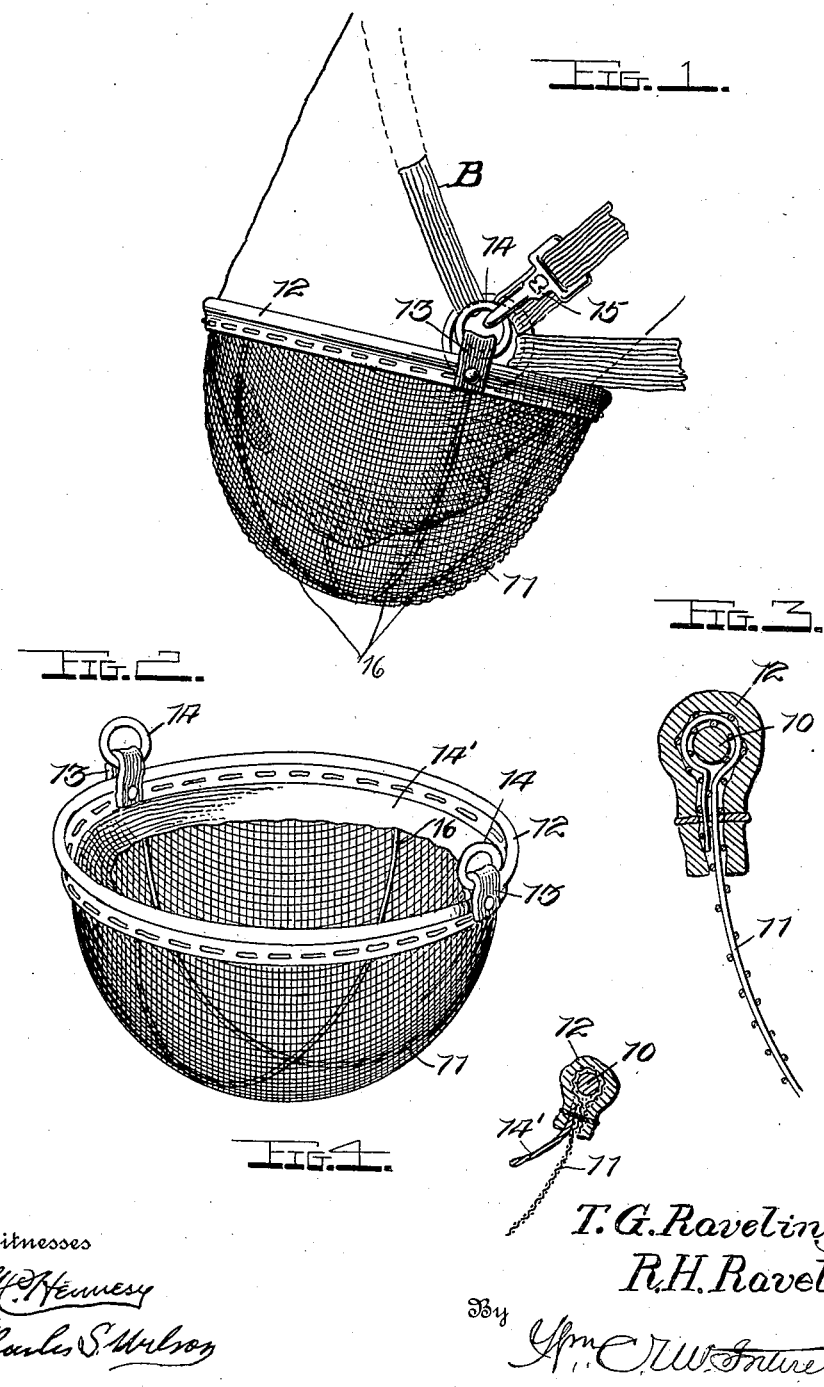
Witnesses
Inventor
T. G. Raveling and
R. H. Raveling,
By
Attorney

UNITED STATES PATENT OFFICE.

TJEBBE G. RAVELING AND RUDOLPH H. RAVELING, OF BUFFALO, NORTH DAKOTA.

FLY-SHIELD.

1,070,914. Specification of Letters Patent. Patented Aug. 19, 1913.

Application filed September 12, 1911. Serial No. 649,000.

*To all whom it may concern:*

Be it known that we, TJEBBE G. RAVELING and RUDOLPH H. RAVELING, citizens of the United States, residing at Buffalo, in the county of Cass and State of North Dakota, have invented certain new and useful Improvements in Fly-Shields; and we do hereby declare the following to be a full, clear, and exact description of the invention, such as will enable others skilled in the art to which it appertains to make and use the same.

This invention relates to new and useful improvements in fly shields for animals' noses, and has for its object a means whereby flies and similar insects may be retained from contact with the muzzle or nose of various animals.

With the above and other objects in view, this invention consists in the construction, combination and arrangement of parts, all as hereinafter more fully described, claimed and illustrated in the accompanying drawings wherein:—

Figure 1 is a side elevation of the fly shield forming the subject matter of the present invention as applied to a horse's nose. Fig. 2 is a perspective view thereof, illustrating a modification thereof. Fig. 3 is a fragmentary section taken from the fly shield. Fig. 4 is a similar view illustrating in detail the modifications set forth in Fig. 2.

The fly shield, forming the subject matter of the present invention, comprises a leather covered ring having a semi-spherical fine wire mesh screen sewed or otherwise secured thereto, said wire screen being bent over said ring to rigidly and firmly engage same. Leather eyes or loops are diametrically secured to said leather covered ring and carry rings which are adapted to be engaged by snap hooks, said snap hooks being carried by the bridle of the animal. In the modification set forth in Figs. 2 and 4 an inwardly extending flexible rubber flange is also carried by the leather covered ring, and provides a means whereby the flies or insects are retained from entrance to the interior of the semi-spherical fly shield.

Referring more particularly to the drawings, 10 indicates a ring adapted to encircle a horse's or other animal's nose, said ring coöperating with a fine semi-spherical wire mesh fly shield 11, the edges of which are bent over said ring 10, as illustrated in Figs. 3 and 4. A U shaped leather ring 12 is bent, the ring 10 and the wire mesh 11 engaging the same, and is sewed into engagement therewith, rigidly and firmly securing said leather ring to the body elements of the fly shield. This protects the animal's nose from irritation by the fly shield, and prevents the sweat of said animal from corroding the metal parts thereof. Diametrically secured to, and spanning the lock ring 12 are the eyes 13, which are riveted to the leather ring and wire mesh, said eyes carrying rings 14 which are adapted to be engaged by the snap hooks 15, carried by the bridle B of the animal.

An inwardly extending dependent flexible rubber flange 14' is retained between the inner portion of the leather ring 12 and secured between said leather ring to the wire mesh, by the stitching which secures the metal ring 10, the wire meshing and the leather ring 12 in coöperative engagement.

When the fly shield, forming the subject matter of the present invention, is attached to an animal's nose, the rubber flange 14' rests against the animal's nose on all sides thereof and prevents flies and other insects from entering the fly shield 11 through the space between the animal's nose and the leather ring 12. In order to stretch the fly shield so that the body portion or mesh 11 thereof will in no way be distorted, the circumferential pieces 16 are arranged therein, in such a manner that the same constitute braces for said fly shield and extend from one side of the ring 10 to the opposite side thereof.

Having thus fully described our invention, what we claim as new, and desire to secure by U. S. Letters Patent, is:—

In a fly shield for animals, a metallic ring, a semi-spherical wire mesh screen having its edge overlapping said ring and secured thereto, circumferential spacing rods secured to the ring and spacing the bottom portion of said screen, a resilient normally dependent guard member secured to said ring and hanging loosely therefrom and adapted to be moved upwardly away from the sides of the screen in accordance with the movement of the animal, a leather casing covering the ring and secured portion of said screen and guard member, and stitched through its edges.

In testimony whereof we affix our signatures in presence of two witnesses.

TJEBBE G. RAVELING.
RUDOLPH H. RAVELING.

Witnesses:
S. G. MORE,
J. H. WENDEL.